United States Patent
LoRicco et al.

(10) Patent No.: US 10,801,344 B2
(45) Date of Patent: Oct. 13, 2020

(54) DOUBLE WALL TURBINE GAS TURBINE ENGINE VANE WITH DISCRETE OPPOSING SKIN CORE COOLING CONFIGURATION

(71) Applicant: United Technologies Corporation, Farmington, CT (US)

(72) Inventors: Nicholas M. LoRicco, Windsor, CT (US); Steven Bruce Gautschi, Milton, MA (US)

(73) Assignee: Raytheon Technologies Corporation, Farmington, CT (US)

(*) Notice: Subject to any disclaimer, the term of this patent is extended or adjusted under 35 U.S.C. 154(b) by 347 days.

(21) Appl. No.: 15/845,727

(22) Filed: Dec. 18, 2017

(65) Prior Publication Data

US 2019/0186291 A1    Jun. 20, 2019

(51) Int. Cl.
*F01D 9/06* (2006.01)
*F01D 9/04* (2006.01)
*F01D 25/12* (2006.01)
*F02C 7/18* (2006.01)
*F01D 5/18* (2006.01)

(52) U.S. Cl.
CPC .............. *F01D 9/065* (2013.01); *F01D 9/041* (2013.01); *F01D 25/12* (2013.01); *F02C 7/18* (2013.01); *F01D 5/187* (2013.01); *F05D 2250/13* (2013.01); *F05D 2260/202* (2013.01); *F05D 2260/204* (2013.01)

(58) Field of Classification Search
CPC ...................................... F01D 5/182
See application file for complete search history.

(56) References Cited

U.S. PATENT DOCUMENTS

| | | | |
|---|---|---|---|
| 7,179,047 B2 * | 2/2007 | Cooper | F01D 5/187 415/115 |
| 7,686,582 B2 | 3/2010 | Cunha | |
| 8,596,961 B2 * | 12/2013 | Tibbott | F01D 5/188 415/115 |
| 9,155,590 B2 | 8/2015 | Spangler | |

(Continued)

FOREIGN PATENT DOCUMENTS

WO        09845577 A1    10/1998

OTHER PUBLICATIONS

European Search Report for European Application No. 18213716.6 dated Apr. 25, 2019.

*Primary Examiner* — Woody A Lee, Jr.
*Assistant Examiner* — Jason G Davis
(74) *Attorney, Agent, or Firm* — Carlson, Gaskey & Olds, P.C.

(57) ABSTRACT

An airfoil includes pressure and suction side walls that extend in a chord-wise direction between leading and trailing edges. The pressure and suction side walls extend in a radial direction to provide an exterior airfoil surface. A main-body core cooling passage is arranged between the pressure and suction walls in a thickness direction and extends radially toward a platform. A skin core cooling passage is arranged in one of the pressure and suction side walls to form a hot side wall and a cold side wall. The hot side wall defines a portion of the exterior airfoil surface and the cold side wall defines a portion of the core passage. The skin core cooling passage is divided by a wall into two discrete first and second skin core cooling passages each supplied with cooling fluid from opposing sides.

18 Claims, 3 Drawing Sheets

(56) References Cited

U.S. PATENT DOCUMENTS

| | | |
|---|---|---|
| 9,163,518 B2 | 10/2015 | Devore et al. |
| 9,267,381 B2 | 2/2016 | Morris et al. |
| 9,523,283 B2 * | 12/2016 | Uechi .................... F01D 5/189 |
| 9,797,261 B2 * | 10/2017 | Tibbott .................. F01D 5/188 |
| 10,012,106 B2 | 7/2018 | Spangler et al. |
| 2003/0044277 A1 | 3/2003 | Bourriaud et al. |
| 2015/0285096 A1 * | 10/2015 | Spangler .................. F01D 9/02 |
| | | 415/115 |
| 2016/0230596 A1 | 8/2016 | Hagan et al. |
| 2016/0326884 A1 | 11/2016 | Lewis |

\* cited by examiner

DOUBLE WALL TURBINE GAS TURBINE ENGINE VANE WITH DISCRETE OPPOSING SKIN CORE COOLING CONFIGURATION

BACKGROUND

This disclosure relates to gas turbine engines and particularly to internally cooled turbine vanes.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

As is well known, the aircraft engine industry is experiencing a significant effort to improve the gas turbine engine's performance while simultaneously decreasing its weight. The ultimate goal has been to attain the optimum thrust-to-weight ratio. One of the primary areas of focus to achieve this goal is the "hot section" of the engine since it is well known that engine's thrust/weight ratio is significantly improved by increasing the temperature of the turbine gases. However, turbine gas temperature is limited by the metal temperature constraints of the engine's components. Significant effort has been made to achieve higher turbine operating temperatures by incorporating technological advances in the internal cooling of the turbine blades.

Various cooling passage configurations have been used to cool turbine vanes, but there may be some inadequacies in some applications. To this end, a double wall cooling configuration has been used to improve turbine vane cooling. In a double wall blade configuration, thin hybrid skin core cavity passages extend radially and are provided in a thickness direction between the core cooling passages and each of the pressure and suction side exterior airfoil surfaces. Double wall cooling has been used as a technology to improve the cooling effectiveness of a turbine blades, vanes, blade out air seals, combustor panels, or any other hot section component.

SUMMARY

In one exemplary embodiment, an airfoil includes pressure and suction side walls that extend in a chord-wise direction between leading and trailing edges. The pressure and suction side walls extend in a radial direction to provide an exterior airfoil surface. A main-body core cooling passage is arranged between the pressure and suction walls in a thickness direction and extends radially toward a platform. A skin core cooling passage is arranged in one of the pressure and suction side walls to form a hot side wall and a cold side wall. The hot side wall defines a portion of the exterior airfoil surface and the cold side wall defines a portion of the core passage. The skin core cooling passage is divided by a wall into two discrete first and second skin core cooling passages each supplied with cooling fluid from opposing sides.

In a further embodiment of any of the above, the skin core cooling passages are otherwise aligned in the chord-wise and thickness directions.

In a further embodiment of any of the above, the airfoil is a turbine vane.

In a further embodiment of any of the above, the platform is an inner platform. The inner platform has a cooling supply passage that is in fluid communication with the first skin core cooling passage.

In a further embodiment of any of the above, the platform is an outer platform. The outer platform has a cooling supply passage that is in fluid communication with the second skin core cooling passage.

In a further embodiment of any of the above, the first and second skin core cooling passages have an aspect ratio that may vary between 3:1≥H/W≥1:5. H corresponds to a passage height and W corresponds to a passage width. The passage height (H) is in a range of 0.010-0.200 inches (0.25-5.08 mm).

In a further embodiment of any of the above, the wall is a located at location in a range of 30-70% span.

In a further embodiment of any of the above, the wall is located at a location of 50%+/−10% span.

In a further embodiment of any of the above, the platform is an inner platform. The inner platform has a cooling supply passage that is in fluid communication with the first skin core cooling passage and comprising an outer platform. The outer platform has a cooling supply passage that is in fluid communication with the second skin core cooling passage.

In a further embodiment of any of the above, a film cooling hole or slot extends from the skin core cooling passage to the exterior airfoil surface.

In another exemplary embodiment, a gas turbine engine includes a combustor section that is arranged fluidly between a compressor section and a turbine section. A stationary stage and a rotating stage are arranged in one of the compressor and turbine sections. An airfoil is arranged in one of the stationary and rotating stages. The airfoil includes pressure and suction side walls that extend in a chord-wise direction between leading and trailing edges. The pressure and suction side walls extend in a radial direction to provide an exterior airfoil surface. A main-body core cooling passage is arranged between the pressure and suction walls in a thickness direction and extends radially toward a platform. A skin core cooling passage is arranged in one of the pressure and suction side walls to form a hot side wall and a cold side wall. The hot side wall defines a portion of the exterior airfoil surface and the cold side wall defines a portion of the core passage. The skin core cooling passage is divided by a wall into two discrete first and second skin core cooling passages each supplied with cooling fluid from opposing sides.

In a further embodiment of any of the above, the skin core cooling passages are otherwise aligned in the chord-wise and thickness directions.

In a further embodiment of any of the above, the airfoil is a turbine vane arranged in the stationary stage of the turbine section.

In a further embodiment of any of the above, the platform is an inner platform. The inner platform has a cooling supply passage that is in fluid communication with the first skin core cooling passage.

In a further embodiment of any of the above, the platform is an outer platform. The outer platform has a cooling supply passage that is in fluid communication with the second skin core cooling passage.

In a further embodiment of any of the above, the first and second skin core cooling passages have an aspect ratio that may vary between 3:1≥H/W≥1:5. H corresponds to a passage height and W corresponds to a passage width. The passage height (H) is in a range of 0.010-0.200 inches (0.25-5.08 mm).

In a further embodiment of any of the above, the wall is located at a location in a range of 30-70% span.

In a further embodiment of any of the above, the wall is located at location of 50%+/−10% span.

In a further embodiment of any of the above, the platform is an inner platform. The inner platform has a cooling supply passage that is in fluid communication with the first skin core cooling passage and comprising an outer platform. The outer platform has a cooling supply passage that is in fluid communication with the second skin core cooling passage.

In a further embodiment of any of the above, a film cooling hole or slot extends from the skin core cooling passage to the exterior airfoil surface.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
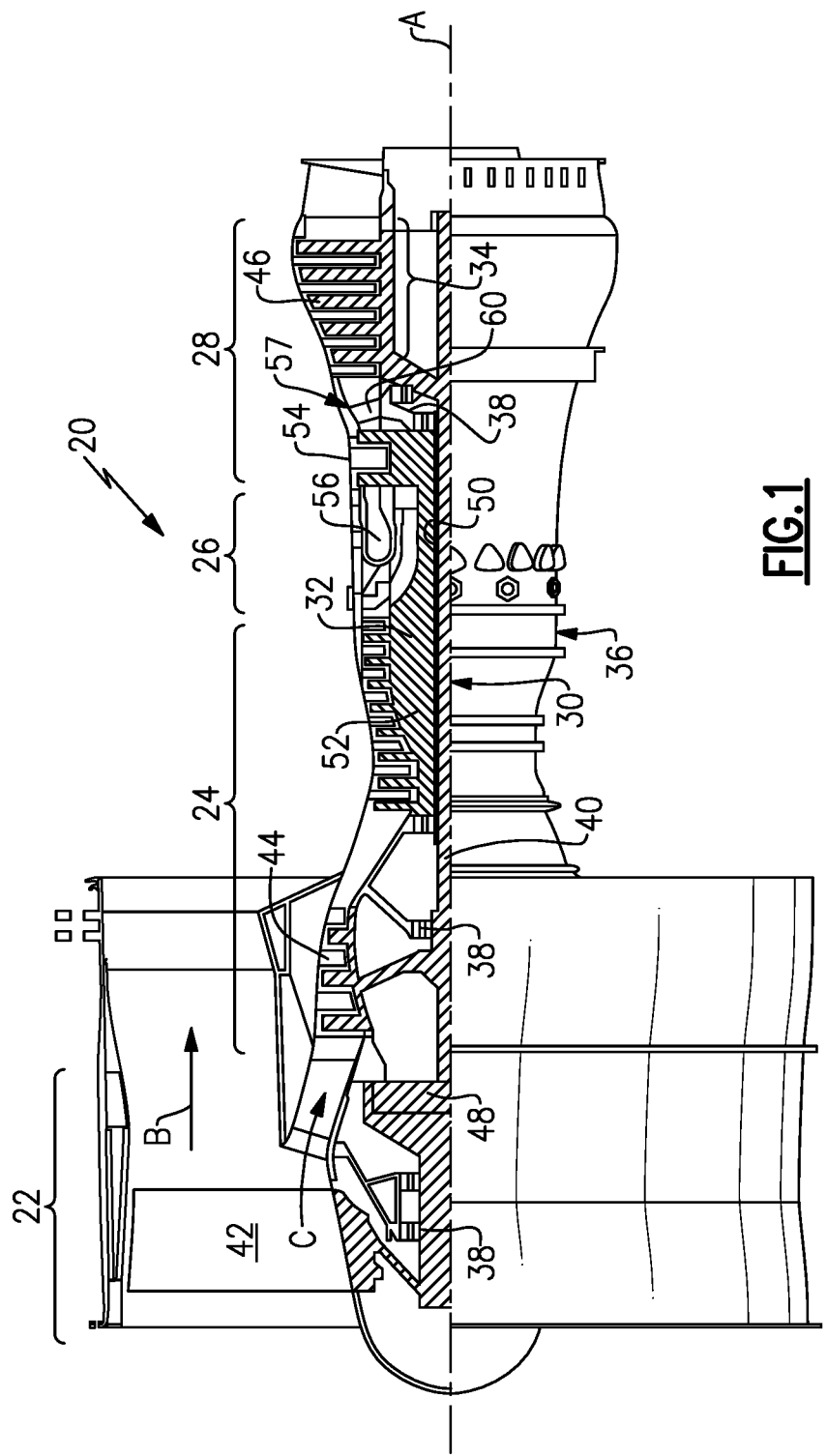
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, geared architecture 48 may be located aft of combustor section 26 or even aft of turbine section 28, and fan section 22 may be positioned forward or aft of the location of geared architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}° \text{ R})/(518.7° \text{ R})]^{0.5}$. The "Low corrected fan tip speed" as disclosed herein according to one non-limiting embodiment is less than about 1150 ft/second (350.5 meters/second).

The disclosed cooling configuration is particularly beneficial for turbine vanes of a gas turbine engine where internal cooling of the airfoil is provided and cooling of the vane platforms is desired, although the disclosed arrangement may also be used in the compressor section or for stator vanes. For exemplary purposes, a turbine vane 68 is described, although the disclosed cooling configuration may be used for blades as well.

Figure 2A:
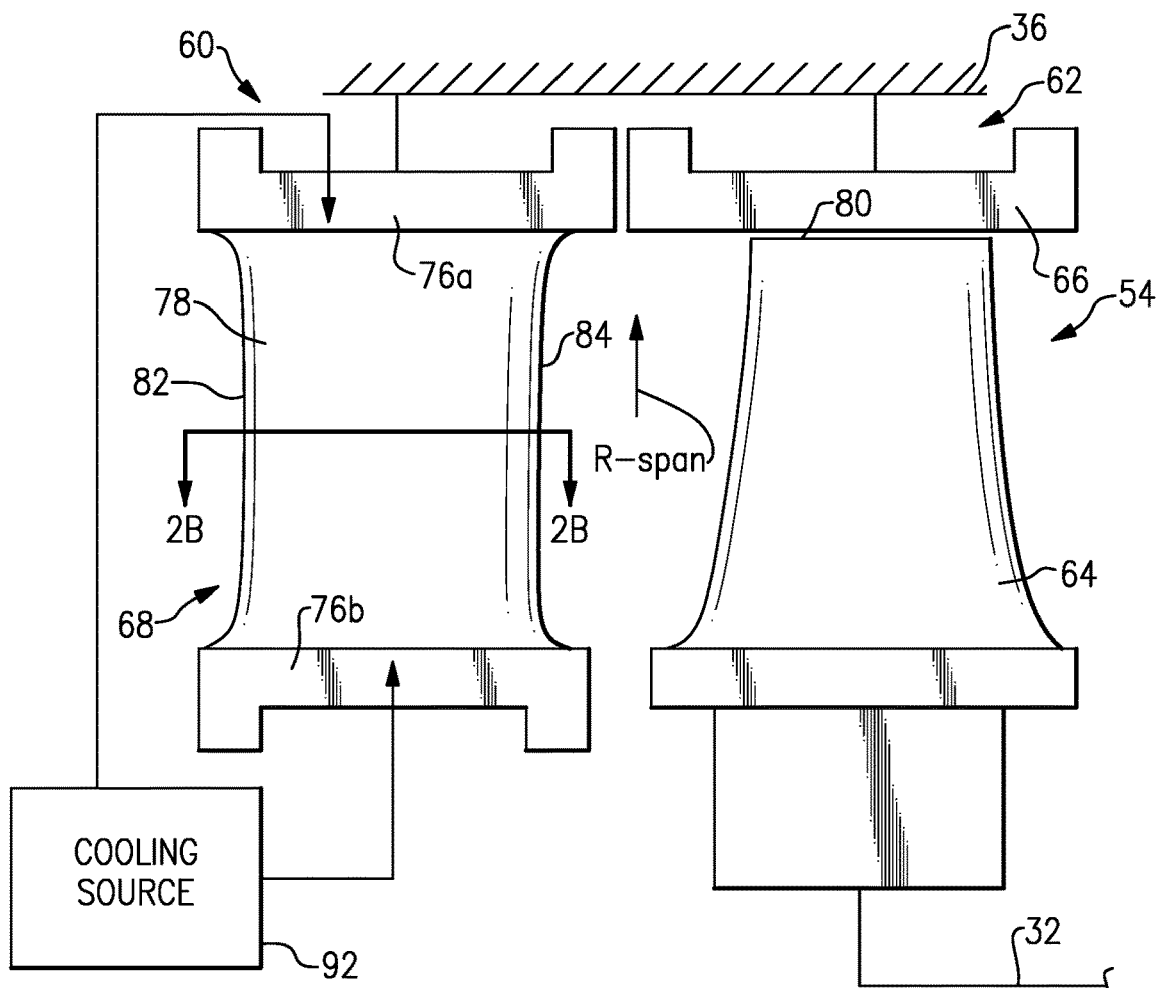
FIG. 2A is a schematic view of a turbine section having a stationary stage with vanes and a rotating stage with blades.
Figure 2B:
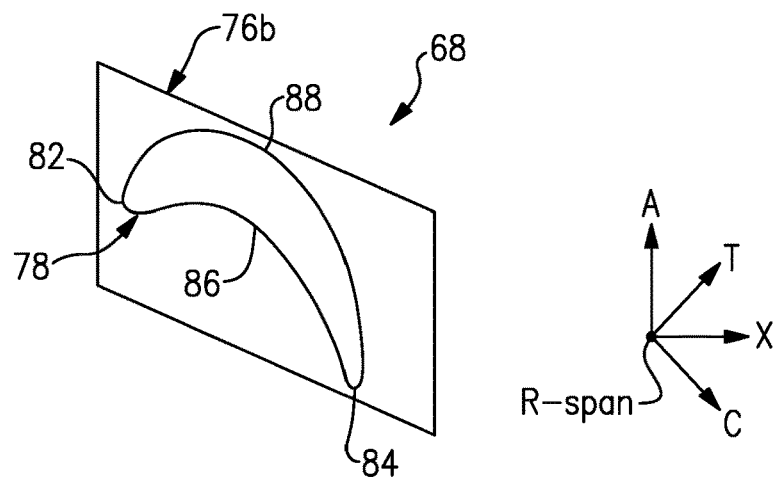
FIG. 2B is a plan view of the airfoil illustrating directional references taken along line 2B-2B in FIG. 2A.

Referring to FIG. 2A, stationary and rotating stages 60, 62 in the high pressure turbine section 54 are shown. The rotating stage 62 includes an array of blades 64 terminating in a tip 80 that is sealed relative to a blade outer air seal 66 supported by the static structure 36. The stationary stage 60 has an array of vanes 68 supported by the static structure 36 Each vane 68 includes at least one airfoil 78 extending spanwise in a radial direction R between outer and inner platforms 76a, 76b. The airfoil 78 has pressure and suction sides 86, 88 extending in a chord-wise direction and joined at leading and trailing edges 82, 84, as shown in FIG. 2B. The pressure and suction side walls 86, 88 extend in the radial direction R to provide an exterior airfoil surface.

The airfoil 78 includes at least one cooling passage provided between the pressure and suction walls 86, 88. The cooling passages are fed a cooling fluid from a cooling source 92, which is typically provided by a compressor bleed stage. Various cooling configurations may be used. For example, in FIG. 3, leading and trailing edge cooling passages 94, 96 are respectively provided near the leading and trailing edges 82, 84 as "up" passages refer to cooling passages that transport cooling fluid radially outward away from the engine centerline, in a direction towards a larger radial outboard location. Conversely, "down" passages, refer to cooling passages that transport cooling fluid radially inward toward the engine centerline, in a direction towards a smaller inboard location. The serpentine cooling passage (collectively referred to as "cooling passage 90") includes a first ("up") passage 90a near the leading edge cooling passage 94 that flows into a second ("down") passage 90b, which flows into a third ("up") passage 90c near the trailing edge cooling passage 96. The first, second and third passages 90a, 90b, 90c are separated by ribs. The serpentine cooling passage 90 and the leading and trailing edge cooling passages 94, 96 are referred to as "central main-body core" passages. Other cooling passage configurations, such as a singular main-body core passage, may also be used. The airfoil's mean camber line bisects the core passages in the example shown.

Referring to FIG. 2A, a cooling source 92, such as bleed air from the compressor section 24, may be fluidly connected to the cooling passages 90, 94, 96 and skin passages 98 to cool the blade 64.

Figure 3:
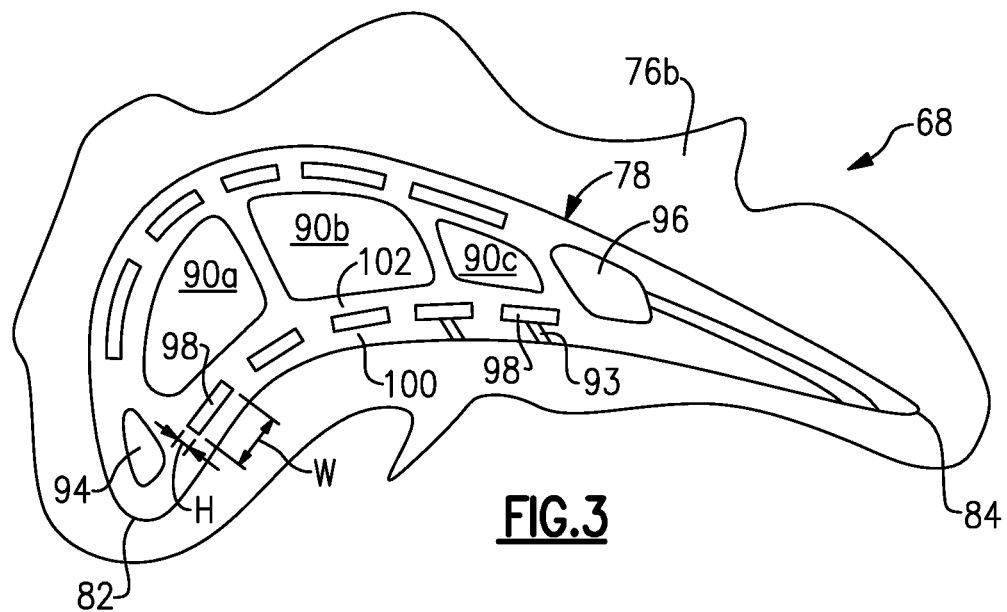
FIG. 3 is a cross-sectional view taken along line 2B-2B of FIG. 2A.
Figure 4:
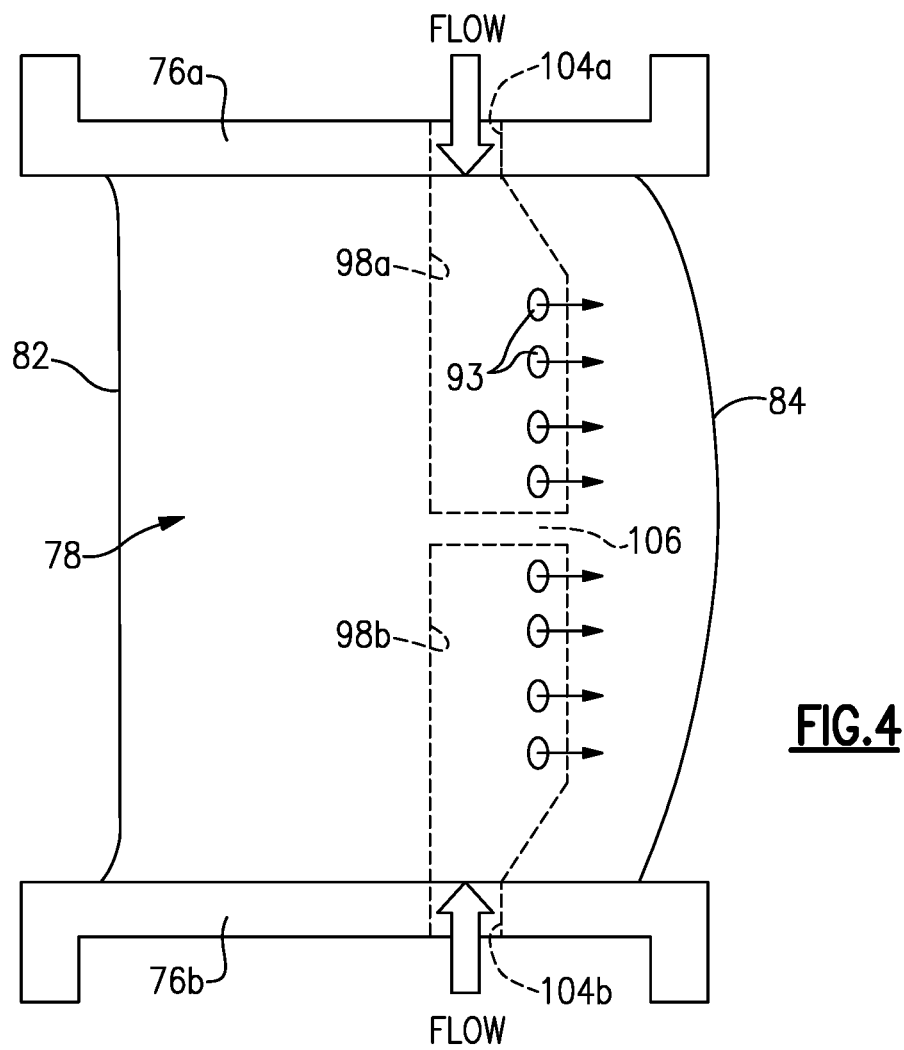
FIG. 4 is a schematic view of an airfoil and platforms of the vane, illustrating the skin core cooling passages.

As shown in FIGS. 3 and 4, one or more skin cooling passages 98 may be provided in the pressure and suction walls 86, 88, which separate these walls into a hot side wall 100 and a cold side wall 102. The hot side wall 100 provides the exterior airfoil surface and an outer surface of the skin core cooling passage 98. The cold side wall 102 provides an inner surface of the skin core cooling passage 98 and a central core cooling passage surface of the central core cooling passage. Film cooling holes 93 may be fluidly connected to the skin core cooling passages 98 to create a thin film boundary layer that protects the airfoil 78 from hot gases in the core flow path C. The skin core cooling passage 98, like the main-body core cooling passage 90, receives cooling fluid from the cooling source 92.

The skin core cooling passages 98 typically have a much lower aspect ratio H/W, cavity height (H) to cavity width (W), than the "central main-body core" passages. Typically, skin core cooling passages have a cavity height (H) to cavity width (W) ratio that may vary in cavity aspect ratio between $3:1 \geq H/W \geq 1:5$. The height of the skin passage 98, which is generally in the thickness direction and typically normal to a tangent line L at the exterior airfoil surface, is in a range of 0.010-0.200 inches (0.25-5.08 mm). The skin passage may vary in height and width along its length.

Particularly in high pressure turbine vane stages, there is a limited pressure ratio available for cooling. Due to the length of the skin core cooling passage 98, there will be a large differential pressure and significant heat pickup, making it difficult to effectively convectively cool the hot wall at the end of the skin core passage. The aforementioned pressure differential and heat pickup also reduces the viability and effectiveness of film cooling provided to the external wall by holes or slots. To address these challenges, as shown in FIG. 4, the skin core cooling passage 98 is divided into two discrete skin core cooling passages 98a, 98b, each supplied with cooling fluid from the cooling source 92 from opposite sides before being exhausted through the film cooling holes 93 or elsewhere.

The outer platform 76a has a cooling supply hole 104a that feeds cooling fluid to a first skin core cooling passages 98a. Similarly, the inner platform 76b has a cooling supply hole 104b that feeds cooling fluid to a first skin core cooling passages 98b. The cooling supply holes 104a, 104b are supplied cooling fluid from the cooling source 92. A wall 106 separates the skin core cooling passages 98a, 98b in the radial direction. The skin core cooling passages 98a, 98b are otherwise aligned in the chord-wise and thickness directions C, T. The wall 106 may be located between 30-70% span location (0% span at the inner platform 76b; 100% span at the outer platform 76a). In the example shown, the wall 106 is arranged at 50%+/−10% span location. The minimum radial thickness of the separating wall is such that typical process variation from core shift does not result in the upper and lower cavities from connecting.

Additive manufacturing and Fugitive Core casting processes allows design flexibility in gas turbine manufacturing. One of the design spaces that additive opens up is in the design of ceramic cores used in the investment casting process. Traditional ceramic cores are made with a core die, which has a finite number of "pull planes." These pull planes restrict the design of ceramic cores to prevent features from overhanging in the direction that the die is pulled when the cores are removed. Additive manufacturing and Fugitive Core processes can remove those manufacturing restrictions, as dies are no longer used to create the ceramic cores.

An additive manufacturing process may be used to produce an airfoil. Alternatively, a core may be constructed using additive manufacturing and/or Fugitive Core manufacturing may be used to provide the correspondingly cooling passage and cooling hole geometries when casting the airfoil. These advanced manufacturing techniques enable unique core features to be integrally formed as part of the entire ceramic core body and then later cast using conventional loss wax casting processes. Alternatively, powdered metals suitable for aerospace airfoil applications may be used to fabricate airfoil cooling configurations and complex cooling configurations directly. The machine deposits multiple layers of powdered metal onto one another. The layers are joined to one another with reference to CAD data, which relates to a particular cross-section of the airfoil. In one example, the powdered metal may be melted using a direct metal laser sintering process or an electron-beam melting process. With the layers built upon one another and joined to one another cross-section by cross-section, an airfoil with the above-described geometries may be produced. The airfoil may be post-processed to provide desired structural characteristics. For example, the airfoil may be heated to reconfigure the joined layers into a single crystalline structure.

It should also be understood that although a particular component arrangement is disclosed in the illustrated embodiment, other arrangements would benefit herefrom. Although particular step sequences are shown, described, and claimed, it should be understood that steps may be performed in any order, separated or combined unless otherwise indicated and will still benefit from the embodiments of the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An airfoil comprising:
   pressure and suction side walls extending in a chord-wise direction between leading and trailing edges, the pressure and suction side walls extending in a radial direction to provide an exterior airfoil surface, a main-body core cooling passage is arranged between the pressure and suction walls in a thickness direction and extends radially toward a platform, a skin core cooling passage is arranged in one of the pressure and suction side walls to form a hot side wall and a cold side wall, the hot side wall defines a portion of the exterior airfoil surface, and the cold side wall defines a portion of the core passage, the skin core cooling passage is divided by a dividing wall into two discrete first and second skin core cooling passages each supplied with cooling fluid from opposing sides, wherein the first and second skin core cooling passages have an aspect ratio that varies in a range of 3:1 >H/W >1:5, wherein H corresponds to a passage height and W corresponds to a passage width, wherein the passage height (H) is in a range of 0.010-0.200 inches (0.25-5.08 mm).

2. The airfoil of claim 1, wherein the skin core cooling passages are aligned in the chord-wise and thickness directions.

3. The airfoil of claim 1, wherein the airfoil is a turbine vane.

4. The airfoil of claim 3, wherein the platform is an inner platform, the inner platform has a cooling supply passage in fluid communication with the first skin core cooling passage.

5. The airfoil of claim 3, wherein the platform is an outer platform, the outer platform has a cooling supply passage in fluid communication with the second skin core cooling passage.

6. The airfoil of claim 1, wherein the dividing wall is located at a location in a range of 30-70% span.

7. The airfoil of claim 6, wherein the dividing wall is located at the location of 50%+/−10% span.

8. The airfoil of claim 6, wherein the platform is an inner platform, the inner platform has a cooling supply passage in fluid communication with the first skin core cooling passage, and comprising an outer platform, the outer platform has a cooling supply passage in fluid communication with the second skin core cooling passage.

9. The airfoil of claim 1, wherein a film cooling hole or slot extends from each of the first and second skin core cooling passages to the exterior airfoil surface.

10. A gas turbine engine comprising:
    a combustor section arranged fluidly between a compressor section and a turbine section;
    a stationary stage and a rotating stage arranged in one of the compressor and turbine sections; and
    an airfoil arranged in one of the stationary and rotating stages, the airfoil includes pressure and suction side walls extending in a chord-wise direction between leading and trailing edges, the pressure and suction side walls extending in a radial direction to provide an exterior airfoil surface, a main-body core cooling passage is arranged between the pressure and suction walls in a thickness direction and extends radially toward a platform, a skin core cooling passage is arranged in one of the pressure and suction side walls to form a hot side wall and a cold side wall, the hot side wall defines a portion of the exterior airfoil surface, and the cold side wall defines a portion of the core passage, the skin core cooling passage is divided by a dividing wall into two discrete first and second skin core cooling passages each supplied with cooling fluid from opposing sides, wherein the first and second skin core cooling passages have an aspect ratio that varies in a range of 3:1 >H/W >1:5, wherein H corresponds to a passage height and W corresponds to a passage width, wherein the passage height (H) is in a range of 0.010-0.200 inches (0.25-5.08 mm).

11. The gas turbine engine of claim 10, wherein the skin core cooling passages are aligned in the chord-wise and thickness directions.

12. The gas turbine engine of claim 10, wherein the airfoil is a turbine vane arranged in the stationary stage of the turbine section.

13. The gas turbine engine of claim 12, wherein the platform is an inner platform, the inner platform has a cooling supply passage in fluid communication with the first skin core cooling passage.

14. The gas turbine engine of claim 12, wherein the platform is an outer platform, the outer platform has a cooling supply passage in fluid communication with the second skin core cooling passage.

15. The gas turbine engine of claim 10, wherein the dividing wall is located at a location in a range of 30-70% span.

16. The gas turbine engine of claim 15, wherein the dividing wall is located at the location of 50%+/−10% span.

17. The gas turbine engine of claim 15, wherein the platform is an inner platform, the inner platform has a cooling supply passage in fluid communication with the first skin core cooling passage, and comprising an outer platform, the outer platform has a cooling supply passage in fluid communication with the second skin core cooling passage.

18. The gas turbine engine of claim 10, wherein a film cooling hole or slot extends from each of the first and second skin core cooling passage to the exterior airfoil surface.

* * * * *